(12) United States Patent
Keshavan Raghavan

(10) Patent No.: US 11,029,063 B2
(45) Date of Patent: Jun. 8, 2021

(54) COMPRESSOR SYSTEM HAVING A REFRIGERATED DRYER

(71) Applicant: INGERSOLL-RAND INDUSTRIAL U.S., INC., Davidson, NC (US)

(72) Inventor: Mahesh Kumar Keshavan Raghavan, Ahmedabad (IN)

(73) Assignee: INGERSOLL-RAND INDUSTRIAL U.S.. INC., Davidson, NC (US)

( * ) Notice: Subject to any disclaimer, the term of this patent is extended or adjusted under 35 U.S.C. 154(b) by 102 days.

(21) Appl. No.: 15/704,139

(22) Filed: Sep. 14, 2017

(65) Prior Publication Data

US 2019/0078813 A1     Mar. 14, 2019

(51) Int. Cl.
*F25B 9/00* (2006.01)
*F25B 31/00* (2006.01)
(Continued)

(52) U.S. Cl.
CPC ............ *F25B 9/004* (2013.01); *B01D 53/265* (2013.01); *F25B 1/06* (2013.01); *F25B 31/006* (2013.01);
(Continued)

(58) Field of Classification Search
CPC . B01D 53/265; F25B 1/06; F25B 9/00; F25B 9/002; F25B 9/004; F25B 31/00; F25B 31/006; F25B 39/00; F25B 39/04; F25B 2600/0261; F25B 2203/02; B08B 5/00; B08B 7/00; B08B 5/02; B05B 15/50; F28G 9/00; F28G 1/00; F28G 1/16; F28G 1/166

USPC ................ 62/401, 404, 303, 306, 310, 314; 165/11.1, 200, 287, 288, 303, 95; 134/56 R; 239/104, 106, 128, 132

See application file for complete search history.

(56) References Cited

U.S. PATENT DOCUMENTS 3,570,265 A * 3/1971 Henry ..................... F04B 39/16
                                                                  62/304
4,666,531 A * 5/1987 Minard ..................... F28G 9/00
                                                                  134/26

(Continued)

FOREIGN PATENT DOCUMENTS

JP              54137757 A   * 10/1979

*Primary Examiner* — Len Tran
*Assistant Examiner* — Gustavo A Hincapie Serna
(74) *Attorney, Agent, or Firm* — Kevin E. West; Advent, LLP

(57) ABSTRACT

A compressor system is disclosed having a refrigerated dryer useful to remove moisture from a wet compressed flow stream produced by a compressor. The refrigerated dryer can include a condenser having a refrigerant fluid conduit and a number of external cooling fins which assist in cooling the refrigerant fluid upon passage of a cooling flow stream past the external cooling fins. The compressor system can include an offtake passage to extract a portion of the wet compressed gas. The extracted portion of compressed gas can be blown in a direction transverse to (e.g. opposite) the direction of cooling air provided by the fan. In one form the fan can be deactivated when the extracted compressed air is flowed past the cooling fins. The compressor system can include a manual operation, operation dictated by a timer, or operations based upon sensed/estimated/etc pressures or temperatures of the compressor system.

8 Claims, 8 Drawing Sheets

(51) Int. Cl.
*F25B 1/06* (2006.01)
*B01D 53/26* (2006.01)
*F25B 39/04* (2006.01)

(52) U.S. Cl.
CPC .......... *F25B 39/04* (2013.01); *B01D 2257/80* (2013.01); *B01D 2258/06* (2013.01); *F24F 2203/02* (2013.01); *F25B 2600/0261* (2013.01)

(56) References Cited

U.S. PATENT DOCUMENTS

| | | | | |
|---|---|---|---|---|
| 5,095,882 | A * | 3/1992 | Christensen | F28F 9/002 |
| | | | | 123/563 |
| 5,226,285 | A * | 7/1993 | Dankowski | F24F 1/0007 |
| | | | | 62/184 |
| 5,279,357 | A * | 1/1994 | Kennon | F28G 3/166 |
| | | | | 122/391 |
| 5,509,972 | A | 4/1996 | Akazawa et al. | |
| 5,699,673 | A * | 12/1997 | Hoshino | B01D 53/265 |
| | | | | 62/93 |
| 6,385,978 | B1 * | 5/2002 | Elliott | B01D 53/265 |
| | | | | 165/111 |
| 6,581,394 | B1 * | 6/2003 | Smolenskiy | B01D 53/261 |
| | | | | 62/172 |
| 6,792,769 | B2 | 9/2004 | Trulaske, Sr. | |
| 7,707,839 | B2 * | 5/2010 | Altunan | F25B 47/00 |
| | | | | 62/77 |
| 9,568,260 | B2 * | 2/2017 | Stone | F28G 1/166 |
| 9,625,223 | B2 | 4/2017 | Gauthier | |
| 10,006,365 | B2 * | 6/2018 | Ramirez | F02C 7/052 |
| 2007/0085522 | A1 | 4/2007 | Mariani et al. | |
| 2007/0125520 | A1 * | 6/2007 | Nutsos | B60H 1/00585 |
| | | | | 165/95 |
| 2014/0238643 | A1 * | 8/2014 | Hains | F28G 9/00 |
| | | | | 165/95 |
| 2016/0186757 | A1 * | 6/2016 | Collins | F04C 29/04 |
| | | | | 418/83 |
| 2016/0377359 | A1 | 12/2016 | Gauthier | |
| 2017/0227307 | A1 * | 8/2017 | Kopalan | F28G 13/00 |
| 2019/0024651 | A1 * | 1/2019 | Kotani | F04B 39/0207 |

\* cited by examiner

COMPRESSOR SYSTEM HAVING A REFRIGERATED DRYER

TECHNICAL FIELD

The present invention generally relates to compressor systems having a refrigerated dryer, and more particularly, but not exclusively, to compressor systems having a refrigerated dryer capable of being cleaned.

BACKGROUND

Providing techniques to improve the working of compressor refrigerated dryers remains an area of interest. Some existing systems have various shortcomings relative to certain applications. Accordingly, there remains a need for further contributions in this area of technology.

SUMMARY

One embodiment of the present invention is a unique compressor system refrigerated dryer. Other embodiments include apparatuses, systems, devices, hardware, methods, and combinations for removing dust/debris from compressor refrigerated dryers. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
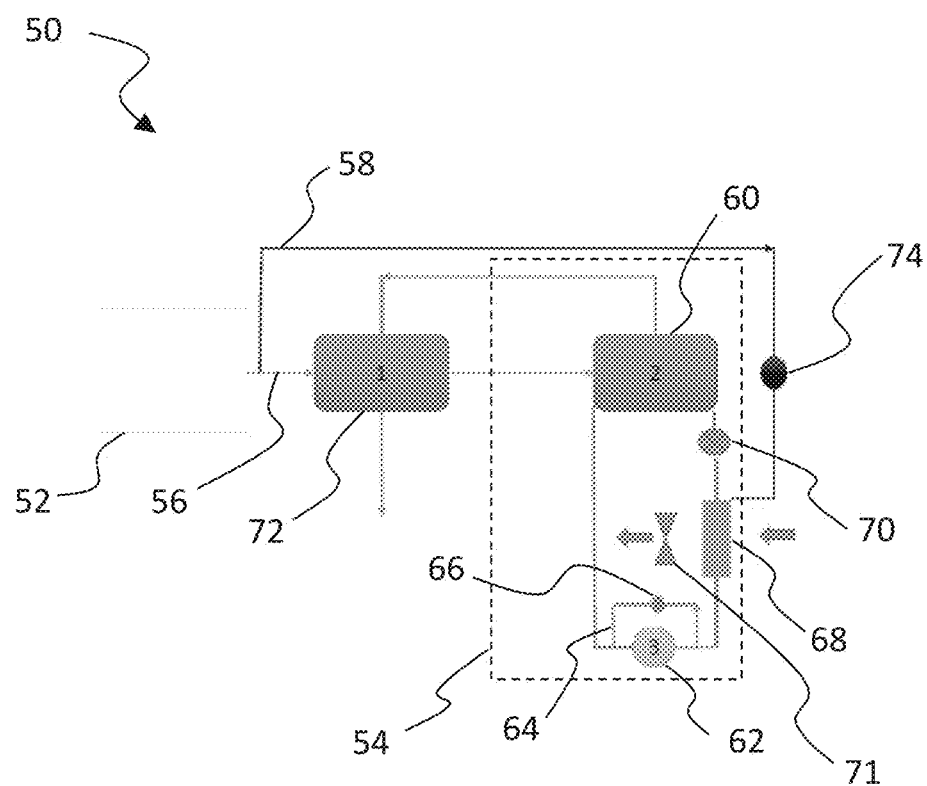
FIG. 1 depicts an embodiment of a compressor system.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, one embodiment of a compressor system 50 is depicted which includes a compressor 52 coupled with a refrigerated dryer system 54 useful to remove unwanted moisture from a flow of wet compressed gas produced by the compressor 52 which is routed through wet compressed gas conduit 56. Also included is an offtake flow path 58 used to extract a portion of the wet compressed gas flow stream that is flowed through conduit 56. Such an extracted portion can constitute a variety of mass fractions of the flow of wet compressed gas that is generated by the compressor 52. Further details are provided below regarding the use of the extracted portion of the wet compressed gas flow stream.

The compressor 52 can take any variety of forms useful to raise a pressure of a working fluid such as air, and can operate at a variety of pressures and flow rates. To set forth just a few nonlimiting examples, the compressor 52 can be a screw type compressor, centrifugal compressor, etc. In some forms the compressor can, but need not be, an oil filled compressor which may or may not be paired with one or more air-oil separators/filters/etc.

The refrigerated dryer 54 can take many forms and in one non-limiting embodiment includes an evaporator 60, refrigerant compressor 62, hot gas bypass 64 controlled by a hot gas bypass valve 66, a fan cooled condenser 68, and an expansion valve 70. It will be appreciated by those of skill in the art that some components may not be needed (e.g. the hot gas bypass 64), while other components can be added.

As depicted in FIG. 1, dried air that has passed through the refrigerated dryer 54 can be routed to an air/air heat exchanger 72 useful to exchange heat between the dried air and an incoming flow stream of wet compressed air flowing through the conduit 56. Not all embodiments need include the air/air heat exchanger 72. The dried air that has been warmed can be delivered to a facility customer or other user of compressed air as is depicted in the vertical arrow exiting the air/air heat exchanger 72.

In one form the condenser 68 includes a series of external radiator fins that assist in removing heat from a refrigerant conduit in the condenser 68 structured to carry hot refrigerant from the refrigerant compressor 62. The fan cooled condenser 68 is cooled through action of a fan 71 which is used to force air through/around/over/etc the fins of the condenser 68. The fan 71 can be positioned and/or operated in its normal configuration to either force air or pull air as heat is transferred from the condenser 68 to the flow of cooling air produced from the fan 71. In the illustrated embodiment, the fan 71 is used to pull air through/around/over/etc the fins of the condenser 68, during which time debris such as dust or other debris may be entrained in the flow of cooling air and cause the condenser radiator fins to become dirty. Debris can include any foreign object that is not desired for operation of the compressor system 50, such as dust, dirt, insects, insect remains, etc.

The extracted portion of the wet compressed gas that flows through the offtake flow path 58 is routed to the fan cooled condenser 68 and can be used as described below to assist in cleaning the radiator fins of the condenser 68. A valve 74 can be coupled to the offtake flow path 58 and used to regulate the flow of the extracted portion of wet compressed gas flowing through the offtake flow path 58. The schematic in FIG. 1 depicts the flow of extracted air being delivered to an upstream corner of the condenser 68, but it will be appreciated that such depiction is merely illustrative. In other embodiments the extracted air can be delivered to other locations. In some forms the extracted air can be delivered direct to an opening (such as a nozzle, etc) which is oriented to guide the air to the radiator fins. In other forms, the extracted air can be split into two or more streams for delivery to separate openings prior to engagement with the radiator fins. In still further additional and/or alternative forms, the extracted air can be delivered to a header or like structure useful to provide a gallery for incoming air prior to being dispensed to one or more passages for delivery to the radiator fins.

Figures 2, 3:
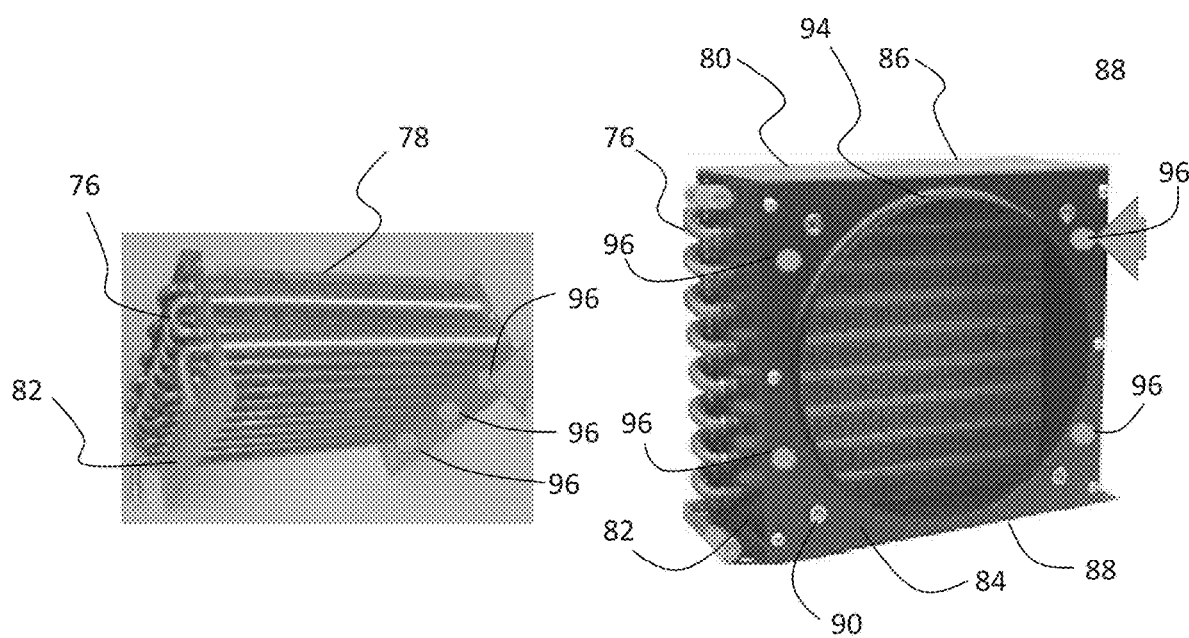
FIG. 2 depicts an embodiment of a condenser used in a refrigerated dryer.
FIG. 3 depicts an embodiment of a condenser used in a refrigerated dryer.

Turning now to FIGS. 2 and 3, two nonlimiting embodiments are illustrated of a condenser 68. FIG. 2 illustrates an embodiment of a condenser 68 having a refrigerant conduit 76 which is structured to carry refrigerant fluid, and a series of external radiator fins 78 in thermal communication with the refrigerant conduit 78 for transferring heat from the refrigerant fluid to the passing flow stream produced from the fan 71. The conduit 78 can have any number of bends, shapes, sizes, etc, and can be made from a variety of materials such as but not limited to copper. In the illustrated embodiment, the conduit 76 is shown being routed from one side of the side plate 82 to another, only to be looped back again, resulting in an integrated assembly between the side plate 82, conduit 76, and fins 78. The side plate 82 can be used as a support bracket to mount the condenser 68. The external fins 78 can also have a variety of shapes, sizes, etc, and can also be made out of a variety of materials. In some applications, the condenser 68 in the form depicted in FIG. 2 can be used to receive air flow from the cooling fan 71 without aid of a housing or other similar structure to direct the flow of air. In other embodiments, however, the condenser 68 can be contained within a structure useful to direct the flow of incoming air more directly to the external radiator fins 78.

An embodiment of the condenser 68 connected to and/or having a fan cowl 80 is depicted in FIG. 3. The cowl 80 can be a separate component that is attached to the condenser 68, but other embodiments can be constructed using different components and processes. For example, the illustration depicted in FIG. 3 can be made by connecting a front face 84 to the side plates 82, such as can be accomplished through any suitable technique, such as riveting, tack welding, etc a front face 84 to the side plates 82. Top plate 86 and bottom plate 88 can also be attached using any suitable technique (riveting, tack welding, etc). In other forms, a box like cowl 80 can be attached to the side plate 82 shown in FIG. 2. In short, many different techniques can be used to manufacture a condenser 68 which is connect to and/or includes a fan cowl 80.

The fan cowl 80 can include any number of potential features, such as but not limited to a fan cowl mounting provision 90 and a fan cowl opening 92. The fan cowl mounting provision 90 can take any form useful to permit coupling of the fan 71 to the cowl 80. For example, the fan cowl mounting provision 90 can take the form of a threaded hole useful to receive a threaded fastener. The fan cowl opening 92 can be any size or shape useful to permit passage of a flow stream of cooling air induced from the fan 71. In one nonlimiting form the fan cowl opening 92 is circular in shape and includes a circumferential lip portion 94 that assists in directing a flow of cooling air. In the illustrated embodiment, the fan 71 is located proximate the circumferential lip portion 94 and is configured to pull air through the condenser 68.

As discussed above in FIG. 1, a portion of the wet compressed gas is extracted from conduit 56 and flowed through offtake flow path 58 before being routed to the condenser 68. The embodiments depicted in FIGS. 2 and 3 can have one or more openings 96 useful to dispense the extracted gas toward the external fins 78. In one form the openings 96 are oriented to dispense the extracted gas in a direction transverse to the direction of cooling flow produced by the fan 71. To set forth just one nonlimiting example, the openings 96 can be oriented to dispense the extracted gas in a direction opposite the cooling flow produced by the fan 71. As illustrated in FIG. 2, the openings 96 can be provided via the side plate 82. Although only one side plate 82 is illustrated in FIG. 2, openings 96 can be provided in the opposing side plate 82 as well. FIG. 3 depicts several openings 96 provide via the front face 84 of the fan cowl 80. In some embodiments, additional and/or alternative openings can be provided in either or both of the top plate 86 and bottom plate 88.

Figure 4:
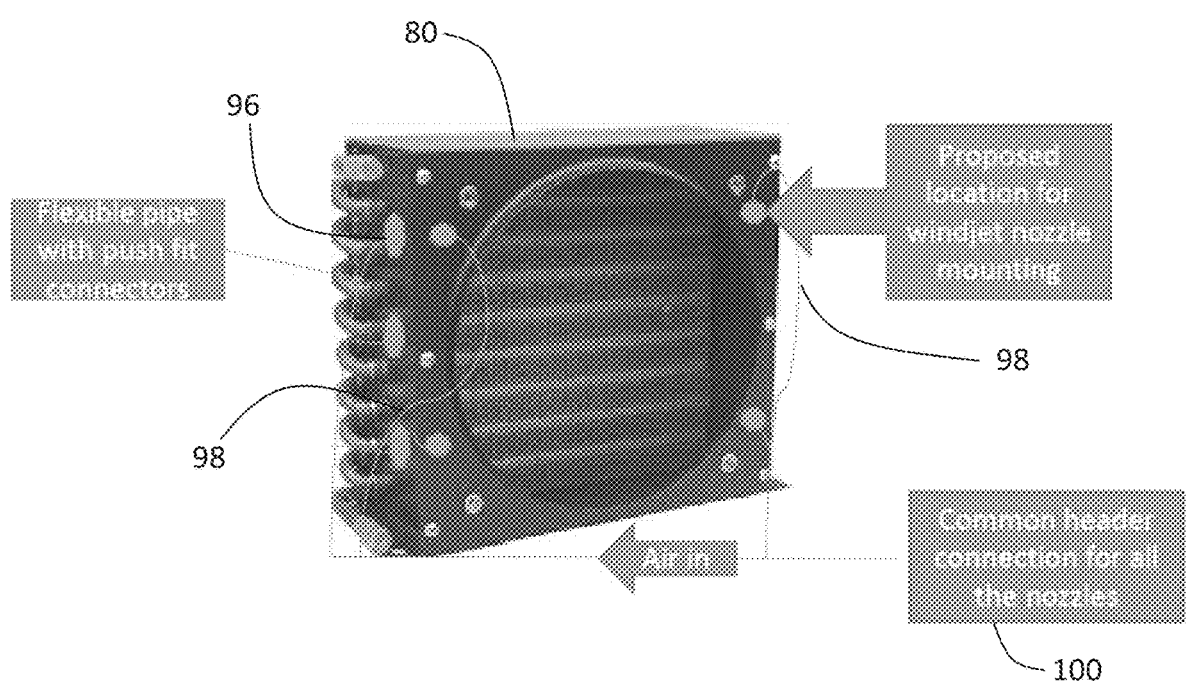
FIG. 4 depicts an embodiment of a condenser used in a refrigerated dryer.

FIG. 4 depicts an embodiment of the condenser 68 and fan cowl 80 having openings 96 and lines 98 useful to convey the extracted wet compressed gas to the openings 96. The lines 98 can take any variety of forms made from any variety of materials. In one nonlimiting embodiment the lines are flexible pipe or flex hose. The lines can be connected to the openings using any variety of approaches, including those with push fit connectors. A common header 100 can be used to receive and feed all openings 96 via lines 98. In some forms a single line 98 extending from the common header can be used to feed multiple openings 96, as can be seen in FIG. 4, while in other embodiments a single line 98 can be used to feed a single opening 96.

Figure 5:
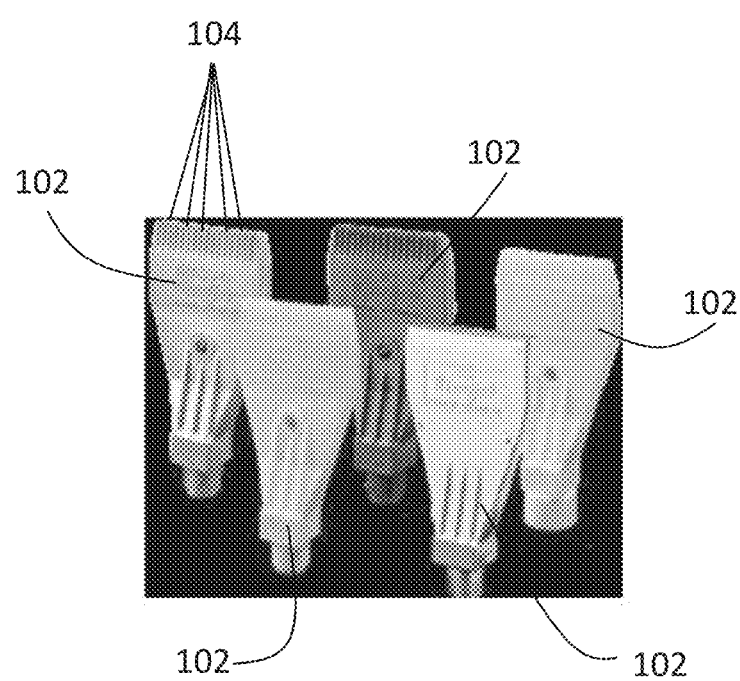
FIG. 5 depicts an embodiment of a nozzle.

Turning now to FIG. 5, in some forms the openings 96 used to deliver the extracted wet compressed gas can be in the form of a nozzle 102 useful to direct and/or provide a spray pattern of the fluid as it flows to the external fins 78. Several different nozzles 102 are illustrated in FIG. 4 which depict just a few nonlimiting shapes and sizes. The nozzle 102 can include an array of individual openings 104 that collectively pass the extracted air received by the nozzle 102. The array of openings 104 can take any variety of shapes, including a single line of openings, but other shapes are also contemplated. As will be appreciated, the shape of the fluid exiting the nozzle 102 can be determined by the distribution of the openings 104. In still further forms, the nozzle 102 may only include one opening 104. Furthermore, nozzles 102 used at any of the opening locations (e.g. those depicted in FIGS. 2-4) can be the same, but some applications can include different type nozzle at one or more of the opening locations. The openings 96 or nozzles 102 can be structured such that they provide a flow rate at least the same as, less than, or greater than the flow rate provided by the fan 71.

Figure 6:
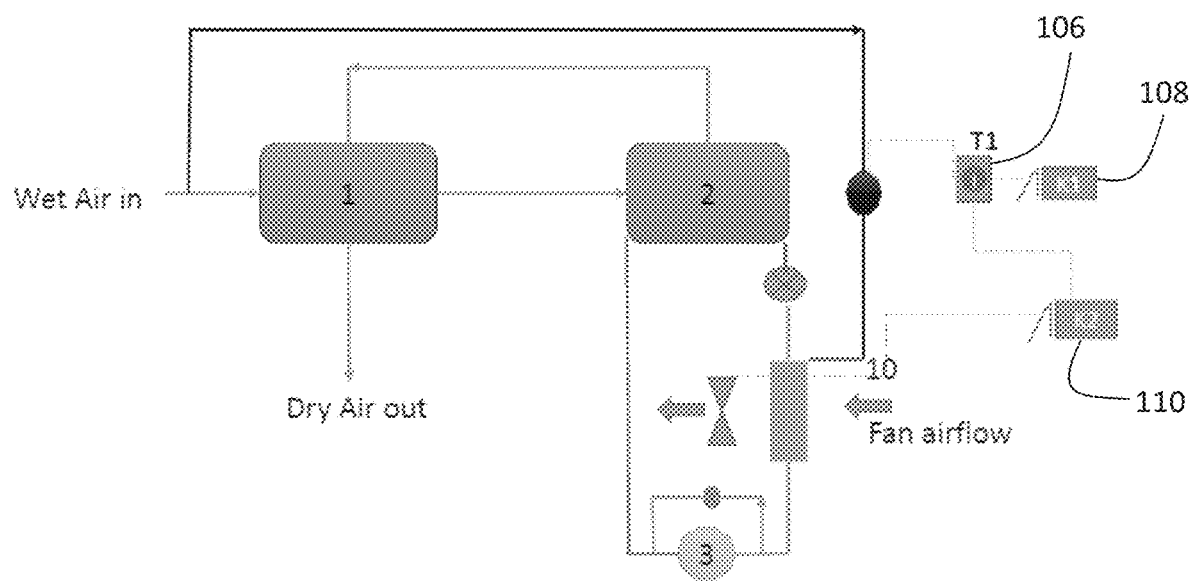
FIG. 6 depicts an embodiment of a compressor system.

Turning now to FIGS. 6-9, several embodiments are depicted of the compressor system 50 having components useful to operate the cooling fan 71 and the extracted flow of compressed gas directed to the condenser 68. FIG. 6 depicts operation of the compressor system 50 through use of a solenoid timer 104, a solenoid contactor 106 to operate the valve 74, and a fan contactor 108 to operate the fan 71. The valve 74 is configured to be normally closed but electrically connected with the solenoid timer 104. The timer 104 can be of settable type to permit selection of a desired time, but some embodiments can be a fixed timer with a fixed duration. The valve-timer assembly in turn is connected through a contactor 108, while the condenser fan 71 is connected with a contactor 110. Although the illustrated embodiment depicts use of a solenoid timer 104 and contactors 106/108, other alternative embodiments that employ a time based approach to activation of the valve 74 are also contemplated.

The contactors 108 and 110 are kept in an open state under normal working of the refrigerated dryer 54. When the timer 106 expires, or becomes true, contactor 108 is activated and opens the valve 74 at the same time contactor 110 disconnects the fan 71 from the dryer 54 main circuit. The pressurized wet compressed air blows through the openings 96 or nozzles 102 and cleans the condenser core when the refrigerant compressor 62 is still working.

Note that the direction of air emitted from the openings 96 or nozzles 102 is from the opposite direction of the actual condenser fan flow which can aid in effective cleaning of the core area. Since the direction of airflow during this condenser cleaning operation is getting reversed it is normally configured such that the condenser fan 71 is electrically disconnected from the system. Also during this servicing operation using the components depicted in FIG. 6 the refrigeration system of the refrigerated dryer 54 need not be turned off. In such an embodiment the design of the openings 96 or nozzles 102 can be such that airflow through those components is more than that of the flowrate of the fan 71. Such a configuration can assist in ensuring that the dryer condenser 68 is cleaned without the system needing to disconnect from the plant service line.

The frequency of the operation described in FIG. 6 can be kept as settable according to the needs of any given application. In some applications, the cleaning operation can be set for every 15 days via the timer 106. Furthermore, the duration of opening of valve 74 can be any duration and also settable. In some applications the minimum 'open' duration for the valve 74 can be 5 minutes. As will be appreciated, the embodiment depicted in FIG. 6 may not require any human intervention to service the condenser 68 in the manner described.

Figure 7:
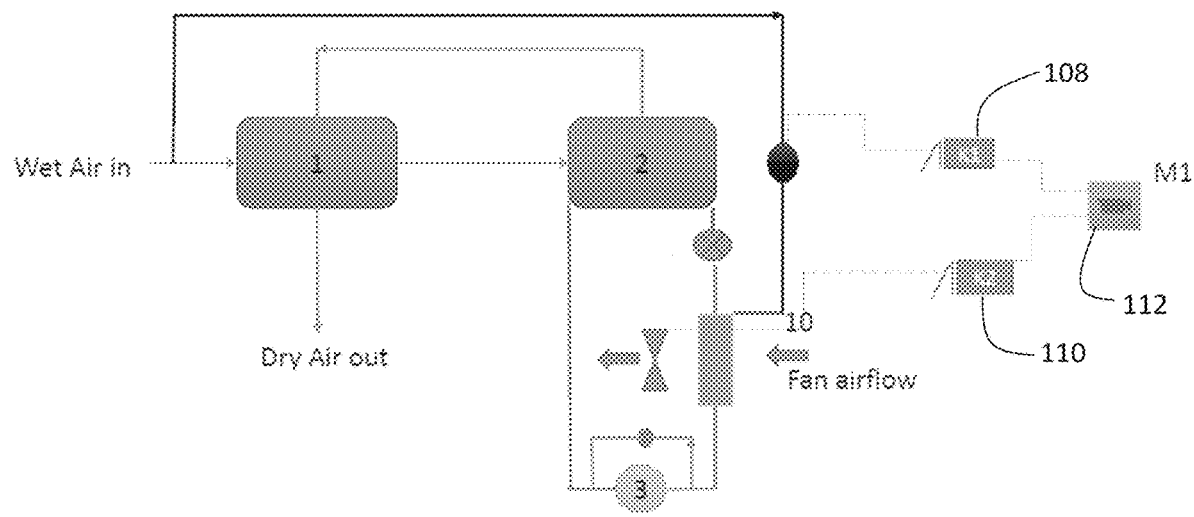
FIG. 7 depicts an embodiment of a compressor system.

FIG. 7 depicts another embodiment of the compressor system 50 which includes a manual override switch 112. As shown in FIG. 7 the normally closed valve 74 is electrically connected with the m annual override 112 through the contactor 108. The condenser fan 71 is also connected with the override switch 112 through contactor 110. The contactors 108 and 110 under normal working of the dryer are kept in a state where no extracted gas passes through the conduit 58 and the fan 71 is operating to flow cooling air for the condenser 68. When the switch 112 is pressed the contactor 108 is activated and opens the valve 74 at the same time the contactor 110 disconnects the fan 71 from the dryer main circuit. The extracted portion of wet compressed air from the compressor 52 thereafter blows through the openings 96 or nozzles 102 to clean the condenser core while the refrigerant compressor 62 remains working to dry the wet compressed gas flowing through the refrigerated dryer 54. The valve 74 can remain open, and the fan 71 turned off, until any number of actions are taken. For example, the switch 112 may be a single pole switch that requires re-activation of the normal mode of operation of the compressor system 50. In other embodiments the switch 112 can be coupled with a timer device such that when manually activated, the fan 71 is turned off and valve 74 permits flow of the extracted compressed gas to the condenser 68 until the timer runs out and at which point the system reverts to normal mode. The switch 112 can also be a pushbutton switch that turns off the fan 71 and activates valve 74 so long as the pushbutton is released.

The switch 112 can be activated at any time, such as upon monitoring condensing temperature or the refrigerant discharge pressure that satisfy certain conditions (e.g. exceeding predetermined limit). As above, in the embodiments discussed with regard to FIG. 6, the direction of air delivered from the openings 96 or nozzles 102 is transverse to, and can be opposite from, the direction of the actual condenser fan flow which can aid in effective cleaning of the core area of the condenser 68. Also as above, the refrigerated dryer 54 need not be turned off during this servicing operation described in FIG. 6.

Figure 8:
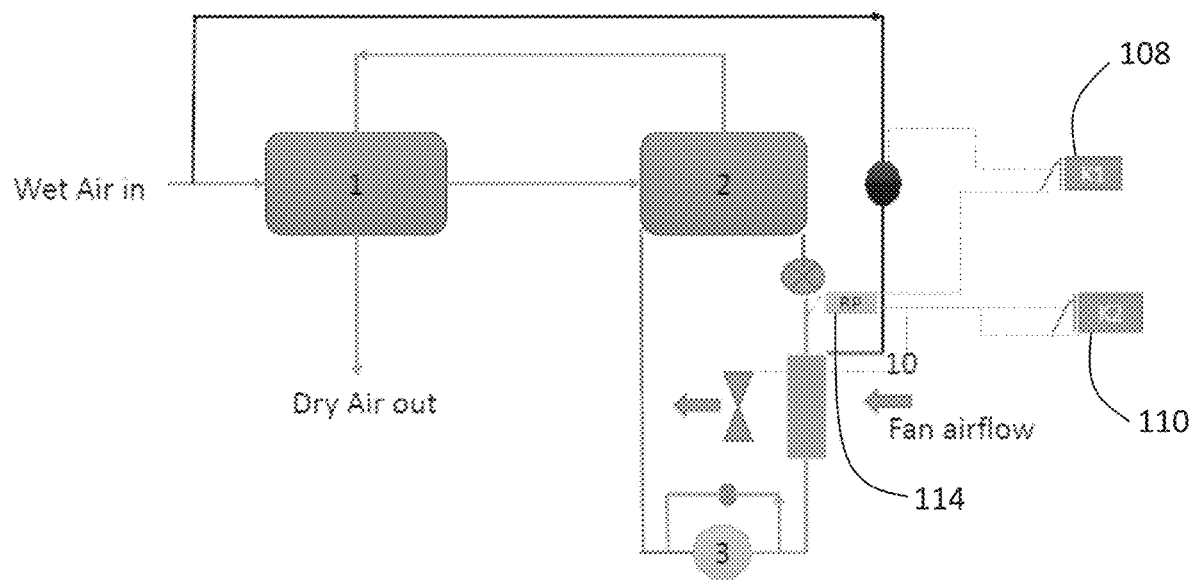
FIG. 8 depicts an embodiment of a compressor system.

FIG. 8 depicts another embodiment of the compressor system 50 which includes a refrigerant pressure switch 114 used to monitor pressure of the refrigerant in the refrigerated dryer 54 and activate the contactors 108 and 110 to perform operations as described above in FIGS. 6 and 7. The refrigerant pressure switch 114 can be a single pole double throw type (SPDT) with auto reset on differential setting. In other forms the refrigerant pressure switch 114 can be a pressure transducer in which signals representative of refrigerant pressure are provided to a controller or other useful device. Such a controller can be used to activate the contactors 108 and 110, or take any suitable action with other components to open valve 74 and turn off fan 71.

Under normal working of the refrigerated dryer 54 the contactors 108 and 110 can be kept open. When the condenser 68 starts to become dirty/clogged/etc with dust or other debris the refrigerant condensing pressure gradually increases. At one point in the embodiment in FIG. 9 such pressure rise triggers the pressure switch 114. When the switch 114 is activated the valve 74 can be opened at the same time the contactor 110 disconnects the fan from the dryer main circuit. The extracted compressed air can be blown through the openings 96 or nozzles 102 to aid in cleaning the condenser core when the refrigerant compressor 62 is still working. The valve 74 can be open till the differential pressure setting on the switch 114 resets automatically.

As above, in the embodiments discussed with regard to FIGS. 6 and 7, the direction of air delivered from the openings 96 or nozzles 102 is transverse to, and can be opposite from, the direction of the actual condenser fan flow which can aid in effective cleaning of the core area of the condenser 68. Also as above, the refrigerated dryer 54 need not be turned off during this servicing operation described in FIG. 8. This embodiment depicted in FIG. 8 need not require any human intervention.

Figure 9:
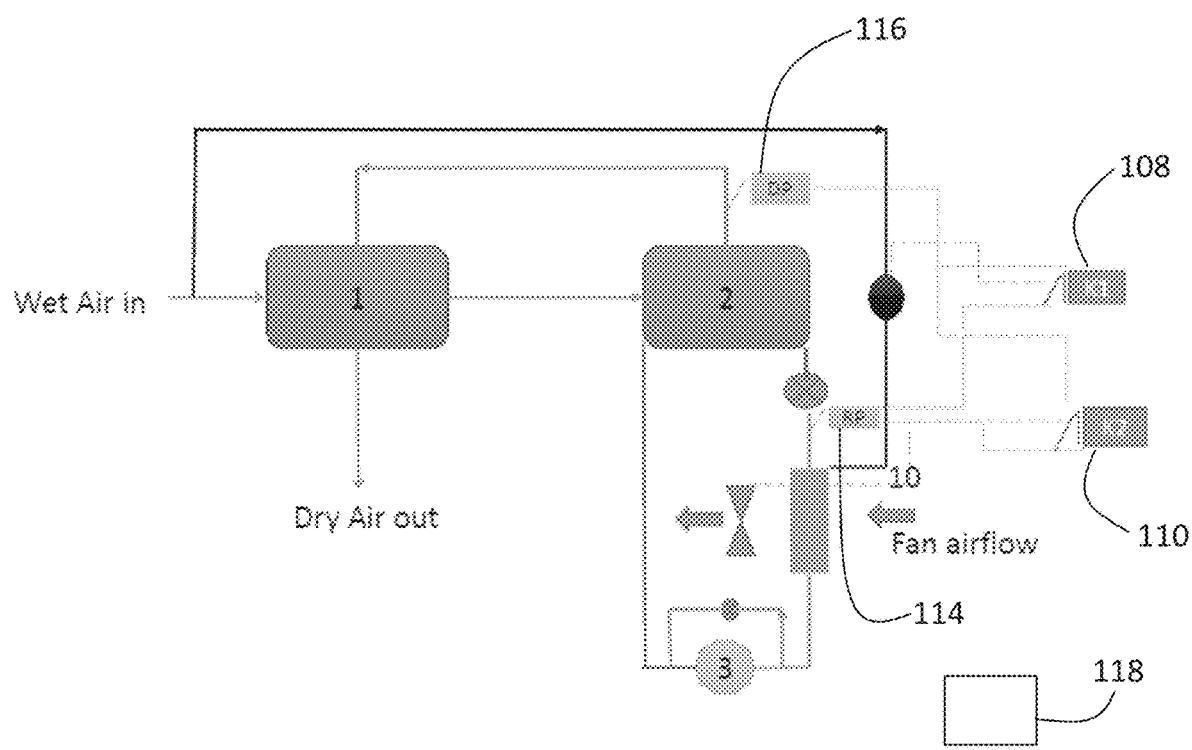
FIG. 9 depicts an embodiment of a compressor system.

FIG. 9 depicts yet another embodiment of the compressor system 50 which includes the refrigerant pressure switch 114 (and any variations) as above in FIG. 8, along with a dew point temperature sensor 116. As in some of the embodiments above, servicing of refrigerant condenser 68 with openings 96 or nozzles 102 can lead to a marginal pressure drop in the line due to air purge out (i.e. the extracted compressed air). There might be some applications in industry where some operations during the day might be critical & would not afford pressure fluctuation. The embodiment depicted in FIG. 9 can be used to avoid excessive pressure drop in air line during critical demand conditions.

As discussed, FIG. 9 includes an additional dew point temperature sensor 116. Drying operation the valve 74 is electrically connected with the refrigerant pressure switch 114 through the contactor 108. The condenser fan 71 is also connected with the refrigerant pressure switch 114 through contactor 110. Both 108 and 110 are interlocked with the dew point temperature sensor. During normal operation, the contactors 108 and 110 are kept open. When the condenser 68 starts clogging the refrigerant condensing pressure increases gradually. At an appropriate point the rise in refrigerant pressure triggers the pressure switch 114. When the pressure switch 114 is activated it attempts to activate the solenoid but the contactors 108 and 110 are configured to be activated only when the preset value of dew point temperature is achieved. When the refrigerant pressure switch 114 is triggered as well as the dew point temperature set value is true then contactor 108 triggers the valve 74 and contactor 110 disconnects the fan 71 from the dryer main circuit. The extracted compressed air blows through the openings 96 or nozzles 102 and cleans the condenser core when the refrigerant compressor is still working. The valve 74 can remain open until the differential pressure setting on the switch 114 resets automatically.

In one form the dew point temperature is set at a lower value than 3 deg C. Dew point temperature can be low in the system when the load on the refrigerated dryer 54 is less. Such a result can mean that the air demand downstream is relatively less. Hence during this condition if there is a marginal pressure drop during purging operation should be ok.

As above, in the embodiments discussed with regard to FIGS. 6-8, the direction of air delivered from the openings 96 or nozzles 102 is transverse to, and can be opposite from, the direction of the actual condenser fan flow which can aid in effective cleaning of the core area of the condenser 68. Also as above, the refrigerated dryer 54 need not be turned off during this servicing operation described in FIG. 9. This embodiment depicted in FIG. 9 need not require any human intervention.

Embodiments and/or separate components depicted in any of FIGS. 6-9 can be combined with each other. For example, the manual override embodiment depicted in FIG. 7 can be coupled with the timed solenoid embodiment of FIG. 6, or the embodiments using either or both the refrigerant pressure switch embodiment and the dew point temperature switch embodiment (FIGS. 8 and 9). In some forms a controller 118 can be used to receive data from any source (e.g. sensors used in 114 or 116) and control devices (e.g. valve 74, fan 71, etc). Any of the embodiments herein can include a controller 118. The controller 118 can be programmable, an integrated state machine, or a hybrid combination thereof. The controller 118 can include one or more Arithmetic Logic Units (ALUs), Central Processing Units (CPUs), memories, limiters, conditioners, filters, format converters, or the like which are not shown to preserve clarity. In one form, the controller 118 is of a programmable variety that executes algorithms and processes data in accordance with operating logic that is defined by programming instructions (such as software or firmware). Alternatively or additionally, operating logic for the controller 118 can be at least partially defined by hardwired logic or other hardware.

One aspect of the present application includes an apparatus comprising a heat exchanger having a conduit for the conveyance of a heat exchange fluid and a plurality of external cooling fins connected to the conduit, the plurality of external cooling fins extending away from the conduit and forming a series of through passages between adjacent ones of the plurality of external fins, the series of through passages structured for the conveyance of a gaseous fluid to assist heat transfer from the heat exchange fluid to the gaseous fluid via the conduit and the external cooling fins, a housing structure attached to the heat exchanger and structured to provide mounting for the heat exchanger, the support structure also forming a ducted flow path to receive the gaseous fluid, and a plurality of air jet nozzles connected to the support structure and oriented to blow the gaseous fluid through the plurality of external cooling fins to clean the external cooling fins from foreign debris.

A feature of the present application includes wherein the plurality of air jet nozzles are directly connected to the housing structure.

Another feature of the present application includes wherein the plurality of air jet nozzles are each structured to provide a flat spray pattern of the gaseous fluid.

Still another feature of the present application includes wherein the housing structure includes a support bracket and cowl separately connected to the heat exchanger.

Yet another feature of the present application includes wherein the plurality of air jet nozzles are connected to the cowl, and wherein the cowl includes an opening to provide the ducted flow path, and wherein the opening includes an inner diameter sized to accommodate an outer diameter of a bladed fan.

Still yet another feature of the present application further includes an air compressor structured to provide the gaseous fluid, and which further includes a dryer structured to remove humidity from a flow of compressed gas produced by the compressor, the dryer including the heat exchanger.

Yet still another feature of the present application further includes a fan to provide forced cooling air across the external cooling fins of the heat exchanger, wherein the gaseous fluid represents an extracted portion of the flow of compressed gas prior to the flow of compressed gas being routed to the dryer, and which further includes a sensor structured to measure one of a dew point temperature in a compressed flow stream dried by the dryer and a pressure in the dryer.

Another aspect of the present application includes an apparatus comprising a compressor structured to compress a working fluid to produce a wet flow of compressed gas, a refrigerated dryer having a refrigeration fluid circulating between an evaporator and a condenser, the evaporator in thermal communication with and useful to remove moisture from the wet flow of compressed gas, the condenser structured to receive warm fluid from the evaporator, wherein the condenser includes a conduit having an internal passage for the conveyance of the refrigeration fluid and an array of external cooling fins in thermal communication with the conduit that conveys the refrigeration fluid, a fan structured to provide motive force to a cooling fluid across the external cooling fins of the condenser, and a plurality of air jet nozzles having an outlet oriented to direct discharge air to the external cooling fins to aid in removal of foreign debris that reduces the heat transfer effectiveness of the external cooling fins.

A feature of the present application includes wherein the plurality of air jet nozzles are connected to the condenser to form an integrated component capable of being removed and replaced as a unit, and which further includes a sensor structured to measure one of a dew point temperature in a compressed flow stream dried by the dryer and a pressure in the dryer.

Another feature of the present application further includes a main discharge conduit from the compressor which is structured to convey the wet flow of compressed gas, which further includes an offtake conduit structured to extract a portion of the wet flow of compressed gas, wherein the offtake fluid is conveyed to the plurality of air jet nozzles.

Yet another feature of the present application further includes a valve structured to regulate the portion of wet flow of compressed gas that is conveyed in the offtake conduit.

Still another feature of the present application includes wherein the plurality of air jet nozzles provides discharge air in a counter flow direction to the flow provided from the fan.

Yet still another feature of the present application includes wherein the discharge air from the plurality of air jet nozzles provides a higher momentum flow than the momentum flow from the fan, wherein the cooling air from the fan does not flow when discharge air from the plurality of air jet nozzles is being provided, and which further includes a manual switch useful to manually operate flow of fluid through the air jet nozzles.

Still yet another feature of the present application includes wherein the plurality of air jet nozzles are directly connected to the condenser, wherein the plurality of air jet nozzles are arranged to provide a flat shaped flow profile of discharge air, and wherein the manual switch also deactivates the fan.

Still another aspect of the present application provides a method comprising compressing gas with a compressor to produce a flow of compressed gas, routing the flow of wet compressed gas to a refrigerated dryer to remove moisture from the wet compressed gas, the refrigerated dryer including a condenser having a plurality of external cooling fins, operating a fan to move air across the external cooling fins in a first direction to air in heat rejection, and flowing a fluid from a plurality of air jet nozzles across the external cooling fins in a second direction opposite the first direction to aid in cleaning the external cooling fins.

A feature of the present application further includes extracting a portion of the flow of wet compressed gas upstream of the refrigerated dryer, and wherein the fluid that is flowed from the plurality of air jet nozzles is the extracted portion of the flow of wet compressed gas.

Another feature of the present application further includes actuating a valve to regulate the extraction of the portion of the flow of wet compressed gas.

Still another feature of the present application further includes actuating a valve to provide the extracted flow of wet compressed gas concurrent with deactivation of the fan.

Yet another feature of the present application includes wherein the extracting the portion of the flow of wet compressed gas is performed at a location intermediate a discharge of the compressor and the refrigerated dryer.

Still yet another feature of the present application further includes regulating the actuation of the valve via a controller, and measuring at least one of a dew point temperature of dried compressed gas from the refrigerated dryer and a pressure of a refrigeration fluid used in the refrigerated dryer.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. An apparatus comprising:
   a compressor structured to compress a working fluid to produce a flow of compressed gas;
   a main discharge conduit from the compressor which is structured to convey the flow of compressed gas;
   a splitter at the main discharge conduit structured to receive the flow of compressed gas, the splitter coupled with an offtake passage and a main passage, the offtake passage structured to flow an offtake flow of compressed gas which includes a portion of the flow of compressed gas flowing into the splitter, the main passage structured to flow a main flow of compressed gas which includes the remainder of the flow of compressed gas that is not flowed to the offtake passage;
   a refrigerated dryer having a refrigeration fluid circulating between an evaporator and a condenser, the evaporator structured to flow relatively cool refrigeration fluid, the evaporator in thermal communication with and useful to remove moisture from the main flow of compressed gas, the condenser structured to receive relatively warm refrigeration fluid from a refrigerant compressor after it has flowed from the evaporator, wherein the condenser includes a conduit having an internal passage for the conveyance of the refrigeration fluid and an array of external cooling fins in thermal communication with the conduit that conveys the refrigeration fluid such that the external cooling fins assist in cooling the relatively warm refrigeration fluid received from the refrigerant compressor;
   a fan structured to provide motive force to a cooling fluid across the external cooling fins of the condenser; and
   a plurality of air jet nozzles having an outlet oriented to discharge the offtake flow to the external cooling fins to aid in removal of foreign debris that reduces the heat transfer effectiveness of the external cooling fins;
   wherein the compressor and offtake passage are sized to provide the offtake flow of compressed gas at an offtake pressure and an offtake flow rate; and
   wherein the offtake pressure and the offtake flow rate of the offtake flow of compressed gas causes the offtake flow discharged from the plurality of air jet nozzles to be at a higher momentum flow than the momentum flow from the fan during operation.

2. The apparatus of claim 1, wherein the plurality of air jet nozzles are connected to the condenser to form an integrated component capable of being removed and replaced as a unit, and which further includes a sensor structured to measure one of a dew point temperature in a compressed flow stream dried by the dryer and a pressure in the dryer.

3. The apparatus of claim 2, which further includes a valve structured to regulate the portion of flow of compressed gas that is conveyed in the offtake conduit.

4. The apparatus of claim 1, wherein the plurality of air jet nozzles provides discharge air in a counter flow direction to the flow provided from the fan.

5. The apparatus of claim 2, wherein the cooling air from the fan does not flow when offtake flow discharged from the plurality of air jet nozzles is being provided, and which further includes a manual switch useful to manually operate flow of fluid through the air jet nozzles.

6. The apparatus of claim 5, wherein the plurality of air jet nozzles are directly connected to the condenser, wherein the plurality of air jet nozzles are arranged to provide a flat shaped flow profile of discharge air, and wherein the manual switch also deactivates the fan.

7. The apparatus of claim 1, wherein the plurality of air jet nozzles are fixed relative to the condenser such that the plurality of air jet nozzles do not move relative to the condenser.

8. The apparatus of claim 7, wherein the condenser is quadrilateral in shape having four corners, and wherein an air jet nozzle of the plurality of air jet nozzles is located at each of the four corners.

\* \* \* \* \*